(12) United States Patent
Cheng et al.

(10) Patent No.: US 7,784,988 B2
(45) Date of Patent: Aug. 31, 2010

(54) DIFFUSION PLATE AND BACKLIGHT MODULE

(75) Inventors: Wen-Feng Cheng, Ping-Zhen Industrial Park (TW); Chao-Ying Lin, Ping-Zhen Industrial Park (TW); Chen-Sheng Lee, Ping-Zhen Industrial Park (TW); Tsung-Chang Yang, Ping-Zhen Industrial Park (TW)

(73) Assignee: Entire Technology Co., Ltd., Taoyuan County (TW)

( * ) Notice: Subject to any disclaimer, the term of this patent is extended or adjusted under 35 U.S.C. 154(b) by 403 days.

(21) Appl. No.: 12/025,841

(22) Filed: Feb. 5, 2008

(65) Prior Publication Data

US 2009/0196035 A1    Aug. 6, 2009

(51) Int. Cl.
*F21V 8/00* (2006.01)
(52) U.S. Cl. .................................. 362/558; 362/561
(58) Field of Classification Search ............... 362/558, 362/560, 561, 607, 606, 619, 620; 359/707, 359/599; 349/64
See application file for complete search history.

(56) References Cited

U.S. PATENT DOCUMENTS

2005/0270654 A1* 12/2005 Goto et al. ............... 359/626
2008/0068716 A1*  3/2008 Goto ......................... 359/599

* cited by examiner

*Primary Examiner*—Sharon E Payne
(74) *Attorney, Agent, or Firm*—Alan Kamrath; Kamrath & Associates PA

(57) ABSTRACT

The invention provides a diffusion plate and a backlight module. The backlight module includes pluralities of light sources, a reflector and a first diffusion plate. The light sources, which are disposed in the reflector, are spatially arranged. The first diffusion plate is disposed on the light sources. There are pluralities of bar-shaped first patterns and second patters, which are arranged in the alternating way, disposed on the emission surface of the first diffusion plate. The contours of first patterns and second patterns are arc shaped. The height of first patterns is H1, and the width is W1. The height of second patterns is H2, and the width is W2. The value of H1/W1 is between 0.4 and 1. The ratio of H2/W2 versus H1/W1 is between 0.6 and 0.9.

11 Claims, 5 Drawing Sheets

DIFFUSION PLATE AND BACKLIGHT MODULE

BACKGROUND OF THE INVENTION

1. Field of the Invention

The present invention relates to a diffusion plate; particularly to a diffusion plate on which two different kinds of patterns are disposed.

2. Description of the Prior Art

In recent years, the conventional cathode ray tube display (commonly called CRT display) has been gradually replaced by liquid crystal display (LCD). The main reason is that the LCD releases far less radiation than the CRT display. Moreover, the production cost of LCD drops significantly in the recent years. In general, the LCD includes a backlight module and a liquid crystal panel. The backlight module mainly aims to provide a light source for the LCD.

The backlight module generally includes a diffusion plate consisting of transparent polymer which is doped with pluralities of optical diffusion particles which can diffuse light generated by cold cathode fluorescent lamps (CCFLs) in order to reduce impact on display quality resulting from illumination shade generated by CCFLs. Without the diffusion plate, there will be visible bright and dark strips on the display surface. In the earlier time, the diffusion plate is a plane structure. As the technology advances, the diffusion plate with patterns disposed on the emission surface has been developed to further improve the display quality.

Refer to FIG. 1 for a front view of a diffusion plate with patterns disposed on the emission surface. There are pluralities of optical diffusion particles inside the diffusion plate 100 in order to diffuse light. The higher concentration of the optical particles there is, the better diffusion effect it is, and the lower transmittance it is. In the present diffusion plate, the transmittance of the diffusion plate 100 is 60%. There are pluralities of patterns 120 disposed on the emission surface 110 of the diffusion plate 100. When light passes through the patterns 120, the travel direction of light changes hence can reduce impact on display quality resulting from the illumination shade generated by CCFLs. However, the diffusion effect of the diffusion plate 100 is not ideal yet. As a result, at least two diffusion films are disposed on the diffusion plate 100 of a prior backlight module to diffuse light more uniformly.

How to make the diffusion plate fully generate desired diffusion effect is an issue remained to be resolved in the industry.

SUMMARY OF THE INVENTION

It is an object of the present invention to provide a diffusion plate to further improve diffusion effect.

To achieve the foregoing object, a diffusion plate consists of a transparent material is provided. There are pluralities of bar-shaped first patterns and second patters, which are arranged by turns, disposed on the emission surface of the diffusion plate. The contours of first patterns and second patterns are shaped. The height of first patterns is H1, and the width is W1. The height of second patterns is H2, and the width is W2. The value of H1/W1 is between 0.4 and 1. The ratio of H2/W2 versus H1/W1 is between 0.6 and 0.9.

In the present diffusion plate, the height H1 of the first patterns is between 0.2 mm to 0.3 mm, and the width W1 is between 0.3 mm and 0.5 mm.

In the present diffusion plate, the material of the diffusion plate can be selected from the group consisting of Polymethyl Methacrylate (PMA), Polycarbonate (PC), Polystyrene (PS), Methyl Methacrylate Styrene (MS), Polypropene (PP), Polythylene (PE), and Polythylene terephthalate (PET).

In the present diffusion plate, the transmittance of the diffusion plate is more than 75%.

To achieve the foregoing object, a backlight module is provided. The backlight module includes multiple light sources, a reflector and a first diffusion plate. The light sources are spatially arranged in the reflector. The first diffusion plate is disposed on the light sources. There are pluralities of bar-shaped first patterns and second patterns, which are arranged by turns, disposed on the emission surface of the first diffusion plate. The contours of the first patterns and the second patterns are arc shaped.

In the present backlight module, the height of the first patterns is H1, and the width is W1. The height of the second patterns is H2, and the width is W2. The value of H1/W1 is between 0.4 and 1. The ratio of H2/W2 versus H1/W1 is between 0.6 and 0.9.

In the present backlight module, the height H1 of the first patterns is between 0.2 mm to 0.3 mm, and the width W1 is between 0.3 mm and 0.5 mm.

In the present backlight module, the material of the diffusion plate can be selected from the group consisting of Polymethyl Methacrylate (PMMA), Polycarbonate (PC), Polystyrene (PS), Methyl Methacrylate Styrene (MS), Polypropene (PP), Polythylene (PER), and Polythylene terephthalate (PET).

In the present backlight module, the transmittance of the diffusion plate is more than 75%.

In the present backlight module, the backlight module includes a second diffusion plate, which is disposed beneath the first diffusion plate. There are pluralities of third patterns disposed on the incident surface of the second diffusion plate. Moreover, the third patterns is prism-shaped structures, and the vertex angle is between 60° and 90°.

Based on the experiment, the diffusion effect is better even though the transmittance of the present diffusion plate is higher.

The foregoing objects, features and advantages of the invention will be more readily apparent from the following detailed description, which proceeds with reference to the accompanying drawings.

DESCRIPTION OF THE PREFERRED EMBODIMENTS

Figure 2:
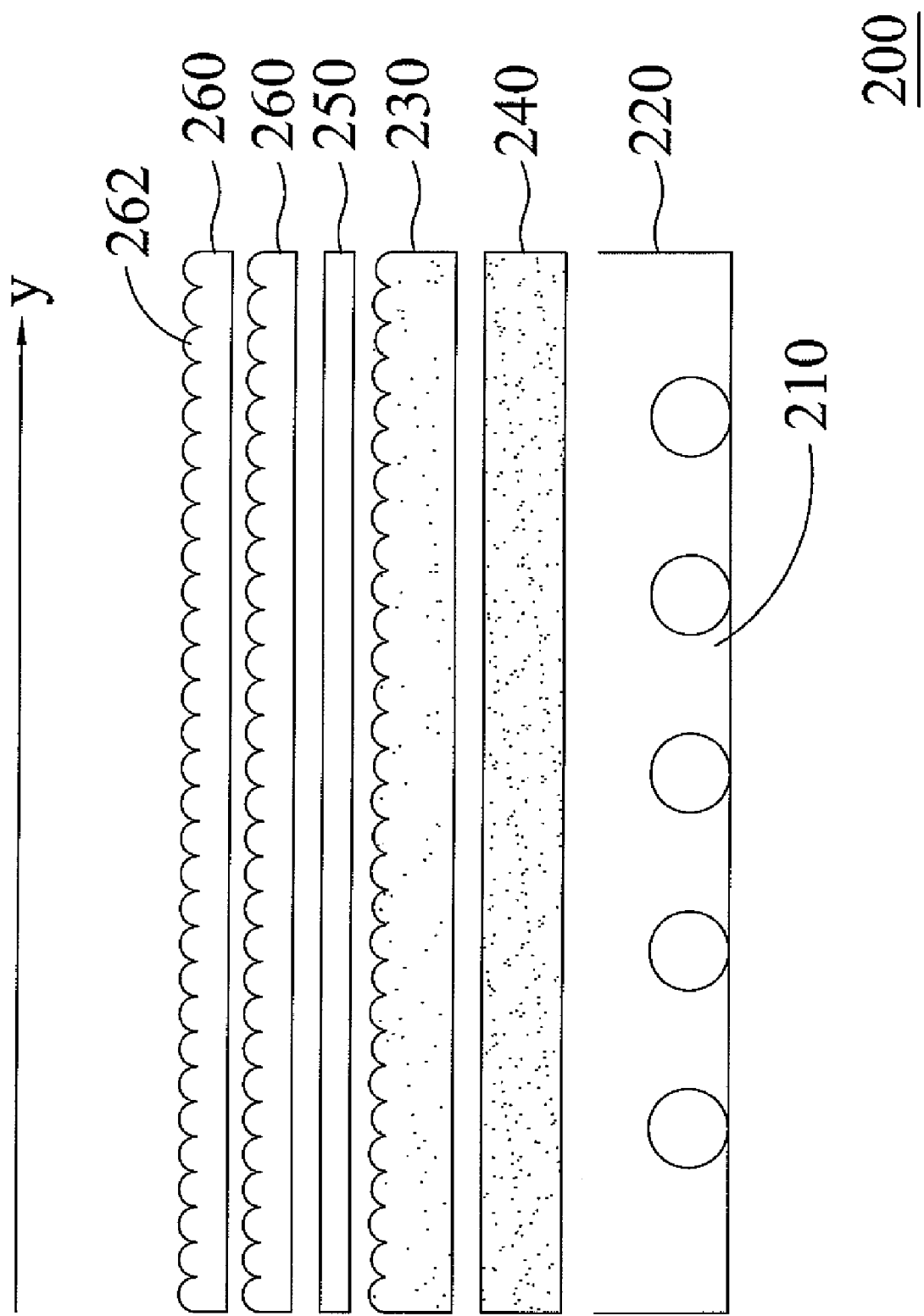
FIG. 2 is a schematic view of the backlight module of the present embodiment of the invention.

Please refer to FIG. 2 for the embodiment of the backlight module of the invention. The backlight module 200 includes light sources 210, a reflector 220, a first diffusion plate 230, and a second diffusion plate 240. The second diffusion plate 240 is disposed underneath the first diffusion plate 230, and both the first diffusion plate 230 and the second diffusion plate 240 are disposed on the light sources 210, which emit light for illumination. In the present embodiment, the light sources 210 are cold cathode fluorescent lamps or spatially arranged light emitting diode. Furthermore, the reflector is used to guide the light, which emits from the light sources 210, toward the first diffusion plate 230 and the second diffusion plate 240.

Moreover, there is also a diffusion film 250, which is used to diffuse light more uniformly, disposed on the first diffusion plate 230. In addition, there are two brightness enhancement films 260 disposed on the diffusion film 250. Pluralities of convex-shaped micro lens 262 are disposed on the brightness enhancement film 260 to condense light.

Figure 3:
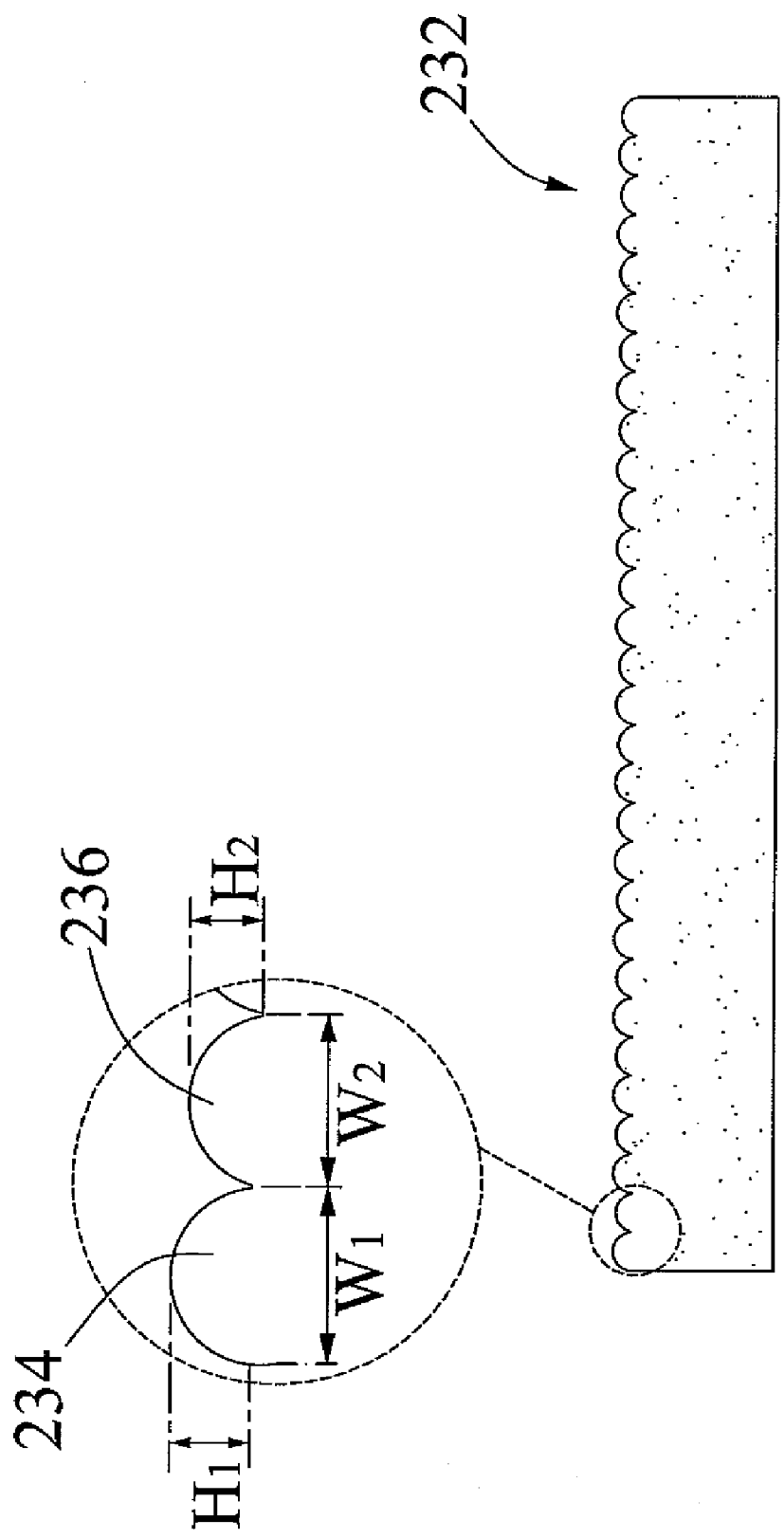
FIG. 3 is a front view of the first diffusion plate depicted in FIG. 2.

Please refer to FIG. 3 for a front view of a first diffusion plate depicted in FIG. 2. There are pluralities of bar-shaped first patterns 234 and second patterns 236 disposed on the emission surface 232 of the first diffusion plate 230. The first patterns 234 and the second patterns 236 are arranged by turns. That is to say, there is a second pattern 236 disposed between two first patterns 234. As FIG. 3 shown, the contours of the first patterns 234 and the second patterns 236 are both arc shaped. The height of the first patterns 234 is H1, and width is W1. The value of H1/W1 is between 0.4 and 1. In another words, the relation between height H1 and width W1 satisfies the following formula:

$$0.4 \leq H1/W1 \leq 1$$

Moreover, the height of the second patterns 236 is H2, and the width is W2. The value of H2/W2 is 0.6 to 0.9 times the value of H1/W1. That is to say, the relation between H2/W2 and H1/W1 satisfies the following formula:

$$0.4 \leq (H2/W2)/(H1/W1) \leq 0.9$$

Figure 1:
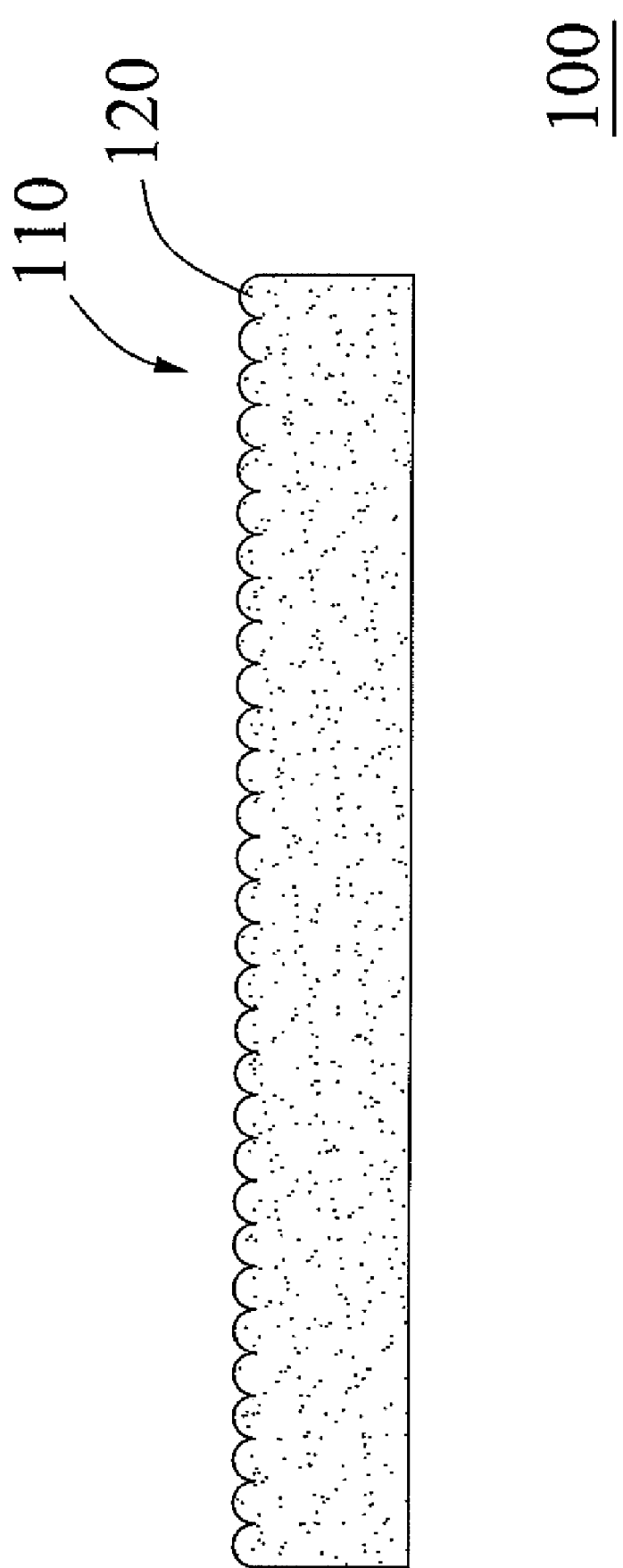
FIG. 1 is a front view of a diffusion plate with patterns disposed on the emission surface.

In the present embodiment, there are pluralities of optical diffusion particles in the first diffusion plate 230, but the concentration of the optical diffusion particles is lower than that of the diffusion plate depicted in FIG. 1. The transmittance of the first diffusion plate 230 is more than 75%, and the transmittance is 85% in the present embodiment. In addition, the material of the first diffusion plate 230 can be selected from the group consisting of Polymethyl Methacrylate (PMMA), Polycarbonate (PC), Polystyrene (PS), Methyl Methacrylate Styrene (MS), Polypropene (PP), Polythylene (PE), and Polythylene terephthalate (PET).

Figure 4:
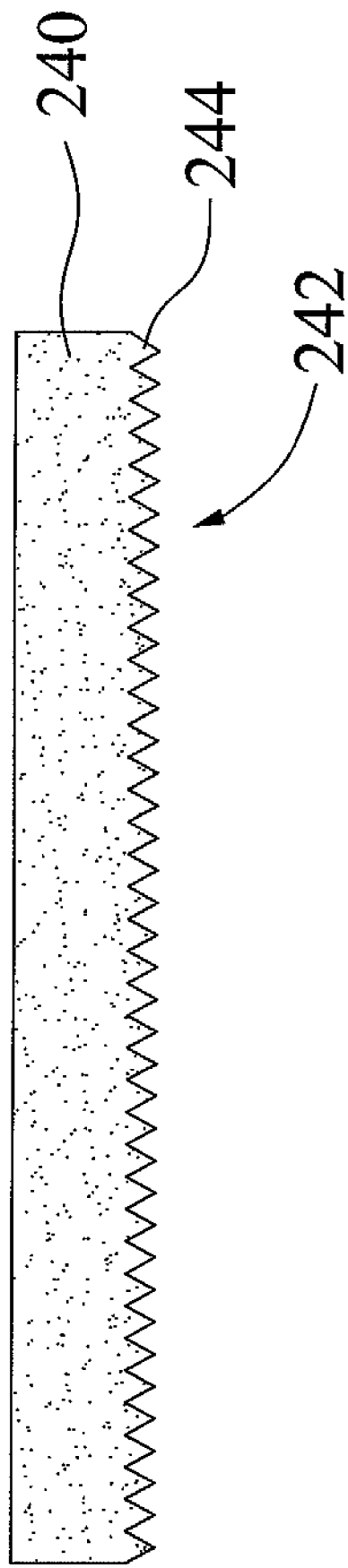
FIG. 4 is a side view of the second diffusion plate depicted in FIG. 2.

Please refer to FIG. 2 and FIG. 4 for a side view of the second diffusion plate depicted in FIG. 2. There are pluralities of third patterns 244 disposed on the incident surface 242 of the second diffusion plate 240. The third patterns 244 are prism-shaped structures. That is to say, the section of the third patterns 244 are triangle-shaped, and the vertex angle is between 60° and 90°.

Figure 5:
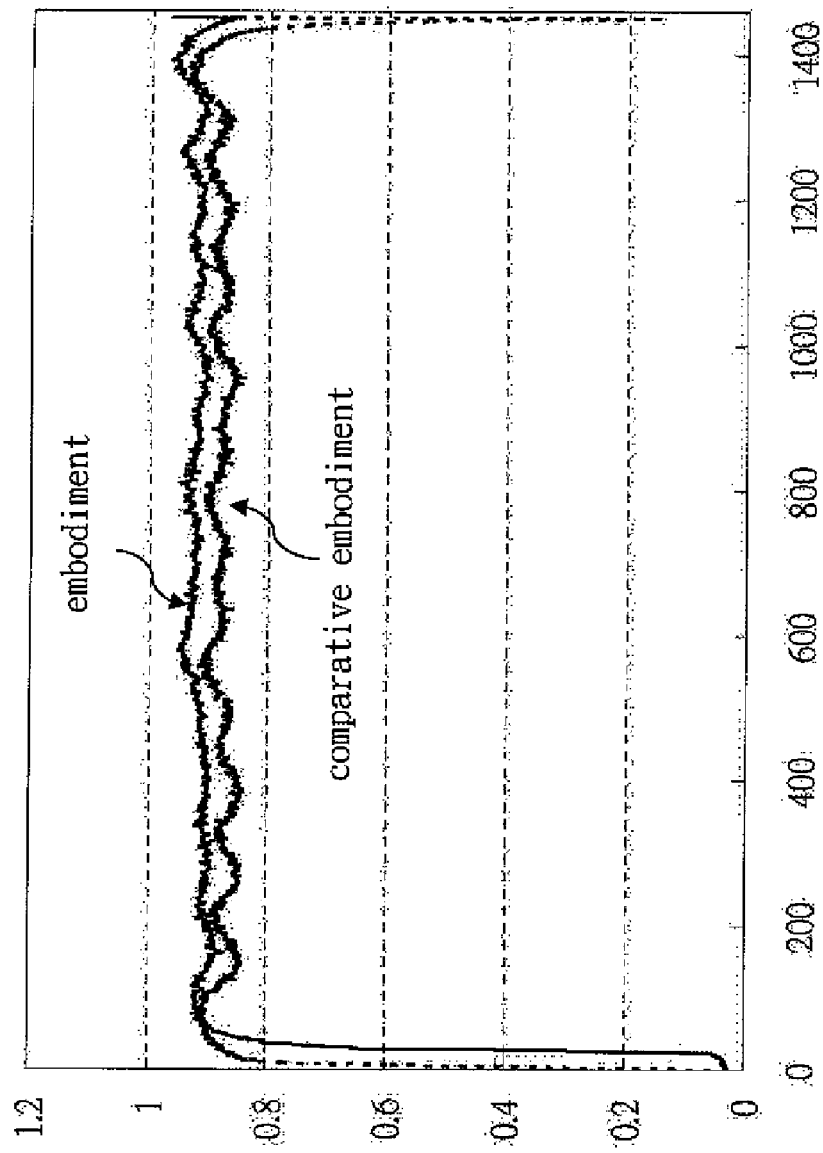
FIG. 5 is an optical measurement result of an embodiment comparing to another backlight module.

The inventors carry out an optical measurement of the backlight module 200 depicted in FIG. 2. There are 1451 measure points, which are separated at intervals, in the Y axis direction. The result of the optical measurement is depicted as the embodiment in the FIG. 5. Then, the inventors replace the first diffusion plate 230 of the backlight module 200 with the diffusion plate 100 depicted in FIG. 1, and carry out the foregoing optical measurement again. The result of the optical measurement is depicted as comparative embodiment in the FIG. 5. In the FIG. 5, the vertex axis represents brightness and the horizontal axis represents measure points, wherein the brightness represented by vertex axis is dimensionless. As shown in FIG. 5, the brightness diagram of the embodiment is higher than that of the comparative embodiment even though the transmittance of the first diffusion plate 230 is higher than the prior diffusion plate 100. Thus the first diffusion plate 230 in the present invention has better diffusion effect.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. A diffusion plate, comprised of a transparent material, has pluralities of bar-shaped first patterns and second patterns; the first patterns and the second patterns, disposed on the emission surface of the diffusion plate, are arranged by turns; the contours of first patterns and second patterns are arc shaped; the height of first patterns is H1, and the width is W1; the height of second patterns is H2, and the width is W2, wherein the value of H1/W1 is between 0.4 and 1, and the ratio of H2/W2 versus H1/W1 is between 0.6 and 0.9.

2. The diffusion plate of claim 1, wherein the height H1 of the first patterns is between 0.2 mm to 0.3 mm, and the width W1 is between 0.3 mm and 0.5 mm.

3. The diffusion plate of claim 2, wherein the material of the diffusion plate is selected from the group consisting of Polymethyl Methacrylate (PMMA), Polycarbonate (PC), Polystyrene (PS), Methyl Methacrylate Styrene (MS), Polypropene (PP), Polythylene (PE), and Polythylene terephthalate (PET).

4. The diffusion plate of claim 1, wherein the transmittance of the diffusion plate is more than 75%.

5. A backlight module, comprising:
pluralities of light sources which are spatially arranged;
a reflector, in where the light sources are disposed;
a first diffusion plate, which is disposed on the light sources, wherein there are pluralities of bar-shaped first patterns and second patters, which are arranged by turns, disposed on the emission surface of the first diffusion plate, the contours of first patterns and second patterns are arc shaped; the height of first patterns is H1, and the width is W1; the height of second patterns is H2, and the width is W2, wherein the value of H1/W1 is between 0.4 and 1, and the ratio of H2/W2 versus H1/W1 is between 0.6 and 0.9.

6. The backlight module of claim 5, wherein the height H1 of the first patterns is between 0.2 mm to 0.3 mm, and the width W1 is between 0.3 mm and 0.5 mm.

7. The backlight module of claim 5, wherein the material of the diffusion plate is selected from the group consisting of Polymethyl Methacrylate (PMMA), Polycarbonate (PC), Polystyrene (PS), Methyl Methacrylate Styrene (MS), Polypropene (PP), Polythylene (PE), and Polythylene terephthalate (PET).

8. The backlight module of claim 5, wherein the transmittance of the diffusion plate is more than 75%.

9. The backlight module of claim 5, further comprising a second diffusion plate, which is disposed beneath the first diffusion plate, wherein pluralities of third patterns are disposed on the incident surface of the second diffusion plate.

10. The backlight module of claim 9, wherein the third patterns are prism-shaped structures.

11. The backlight module of claim 9, wherein the vertex angle of the prism-shaped structures is between 60° and 90°.

* * * * *